United States Patent
Murray

(10) Patent No.: US 9,889,772 B2
(45) Date of Patent: Feb. 13, 2018

(54) SEAT SWIVEL RESTRICTOR FOR WORKING VEHICLE

(71) Applicant: AGCO Corporation, Hesston, KS (US)

(72) Inventor: Timothy Allen Murray, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/413,295

(22) Filed: Jan. 23, 2017

(65) Prior Publication Data

US 2017/0210251 A1    Jul. 27, 2017

Related U.S. Application Data

(60) Provisional application No. 62/281,589, filed on Jan. 21, 2016.

(51) Int. Cl.
*B60N 2/14*        (2006.01)

(52) U.S. Cl.
CPC ............... *B60N 2/14* (2013.01); *B60N 2/146* (2013.01)

(58) Field of Classification Search
USPC ................. 248/425; 297/344.21, 344.22; 296/65.01, 65.06, 65.11, 65.13, 65.14
See application file for complete search history.

(56) References Cited

U.S. PATENT DOCUMENTS

| | | | |
|---|---|---|---|
| 4,123,028 A | 10/1978 | Quakenbush | |
| 5,042,864 A * | 8/1991 | Mochizuki | B60N 2/14 248/393 |
| 5,882,074 A | 3/1999 | Kojima | |
| 6,572,172 B1 | 6/2003 | Ninomiya et al. | |
| 8,079,641 B2 * | 12/2011 | Lung | B60N 2/06 297/344.24 |
| 2001/0038223 A1 | 11/2001 | Suga et al. | |
| 2003/0160488 A1 * | 8/2003 | Kim | B60N 2/146 297/344.22 |
| 2008/0211284 A1 * | 9/2008 | Mutou | B60N 2/146 297/354.1 |
| 2014/0217796 A1 * | 8/2014 | Haller | B60N 2/508 297/344.26 |

FOREIGN PATENT DOCUMENTS

| | | |
|---|---|---|
| WO | 8400525 A1 | 2/1984 |
| WO | 9843849 A1 | 10/1998 |

* cited by examiner

*Primary Examiner* — Alfred J Wujciak

(57) ABSTRACT

A swivel restrictor assembly limits the maximum range an operator seat may be rotated to prevent interference of the seat with other components in a work vehicle cab. The swivel restrictor assembly includes two swivel stops to enable a first range of rotation when the seat is in a forward position of the cab and the second range of rotation when the seat is in a rear position of the cab.

6 Claims, 5 Drawing Sheets

SEAT SWIVEL RESTRICTOR FOR WORKING VEHICLE

CROSS REFERENCE TO RELATED APPLICATION

This application claims the benefit of U.S. Provisional Application No. 62/281,589 filed Jan. 21, 2016, which is hereby incorporated by reference in its entirety.

BACKGROUND OF THE INVENTION

Field of Invention

This disclosure relates to working vehicles such as agricultural vehicles, and more particularly to an operator seat that can swivel to its maximum when the seat is moved forward but the seat swivel is limited when the seat is moved rearward to reduce interferences in the cab.

Description of Related Art

Many different arrangements of rotating seats are known which address mobility and alignment problems for a vehicle operator within the confined space of an automobile or work vehicle cab. The currently known rotating seat options for a work vehicle are troublesome because the rotation of the seat within the cab often interferes with the safe use of operating controls or instruments contained in the work vehicle cab especially when the operator seat is in the rearward position within the cab. Currently rotating seats are either on or off and require a separate setting of the front to back location of the seat within the cab. It is difficult to make simultaneous adjustment of the seat position that facilitates operator comfort, field of vision and operation of controls and equipment under fluctuating field conditions. The present invention was made in view of the above problem and its object is to provide limited swivel of the operator seat when in the rearward position.

BRIEF SUMMARY OF THE INVENTION

In one aspect, the invention is directed to a swiveling operator seat for a work vehicle. The operator seat includes a seat mounting base and a seat bottom. The operator seat has an intermediate assembly having a seat pan and a base plate. The seat bottom is mounted on the seat pan, the seat pan being mounted to the base plate with a swiveling mechanism so that the seat pan rotates relative the base plate. The base plate is mounted for translational forward and rearward movement with respect to the seat mounting base between a forward-most position and a rearward-most position. Accordingly, the seat base is mounted for rotational and translational movement relative the seat mounting base. The operator seat also includes a swivel restrictor assembly which limits a range that the seat bottom may be rotated. The range the seat bottom may be rotated is different in the forward-most position and the rearward-most position.

In one embodiment, the swivel restrictor assembly has a first swivel stop mounted on the seat pan and a second swivel stop mounted on the seat mounting base, wherein the first swivel stop contacts the second swivel stop to limit the range that the seat bottom may be rotated. The base plate has a slot formed therein and the first swivel stop moves in the slot when the seat pan rotates relative the base plate.

BRIEF DESCRIPTION OF THE DRAWINGS

The disclosed subject matter will be further explained with reference to the attached figures, wherein like structure or system elements are referred to by like reference numerals throughout the several views.

Corresponding reference characters indicate corresponding parts throughout the several views of the drawings.

DESCRIPTION OF EXAMPLE EMBODIMENTS

Figure 1:
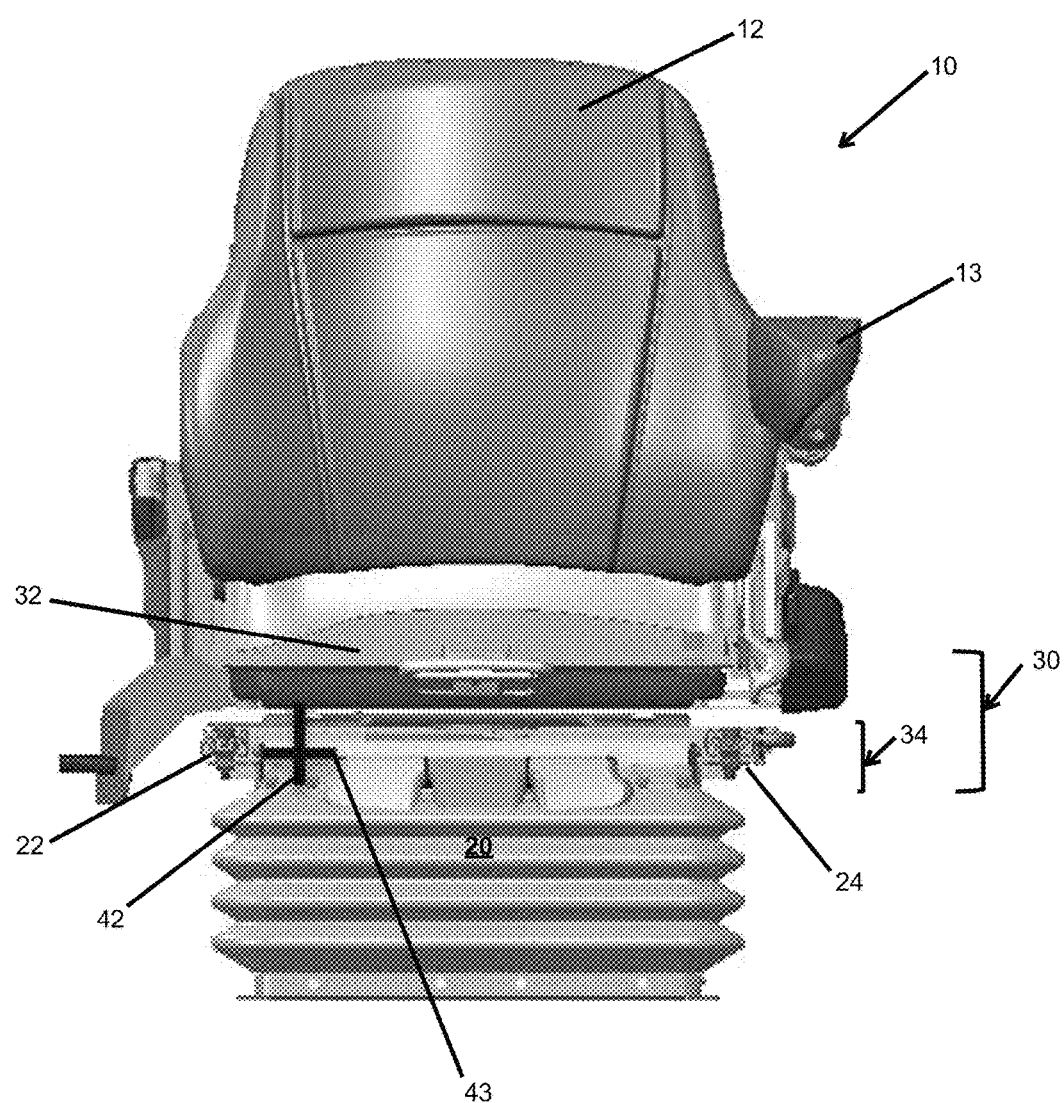
FIGS. 1-5 illustrate an operator seat with a seat swivel restrictor according to one embodiment of the invention.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

The following detailed description illustrates the invention by way of example and not by way of limitation. This description will clearly enable one skilled in the art to make and use the invention, and describes several embodiments, adaptations, variations, alternatives and uses of the invention, including what is presently believed to be the best mode of carrying out the invention.

Turning now to the drawings, FIG. 1 illustrates a swiveling operator seat (10) for a working vehicle, such as an agricultural tractor. However, one skilled in the art will understand that the operator seat disclosed herein may be used in other types of vehicles. The operator seat (10) is mounted on a mounting base (20) by an intermediate assembly (30) which allows for both translational and swiveling movement of the operator seat (10) with respect to the mounting base (20). As is customary, the operator seat (10) desirably comprises a seat bottom (11) and a seat back (12), which may be hingedly supported on the seat bottom (11). The operator seat (10) further includes at least one armrest (13).

The intermediate assembly (30) includes a seat pan (32) on which the seat bottom (11) of the operator seat (10) is mounted and a translation structure (34) that permits forward and rearward translational movement of the seat pan (32) and seat bottom (11) with respect to the mounting base (20). The translation structure (34) includes a base plate (35). In one embodiment, the base plate (35) is configured to slide on rails (22, 24) on the mounting base (20) as is known in the art. However, any known structure permitting forward and rearward movement of the intermediate assembly (30) relative the mounting base (20) may be used using sound engineering judgment.

The seat pan (32) is rotatably mounted on the base plate (35) with a swivel mechanism (36). The swivel mechanism (36) allows the seat pan (32) and thus the seat bottom (11) to be rotatable (at least partially) about a substantially vertical first axis (VA) with respect to the base plate (35).

Figure 2:
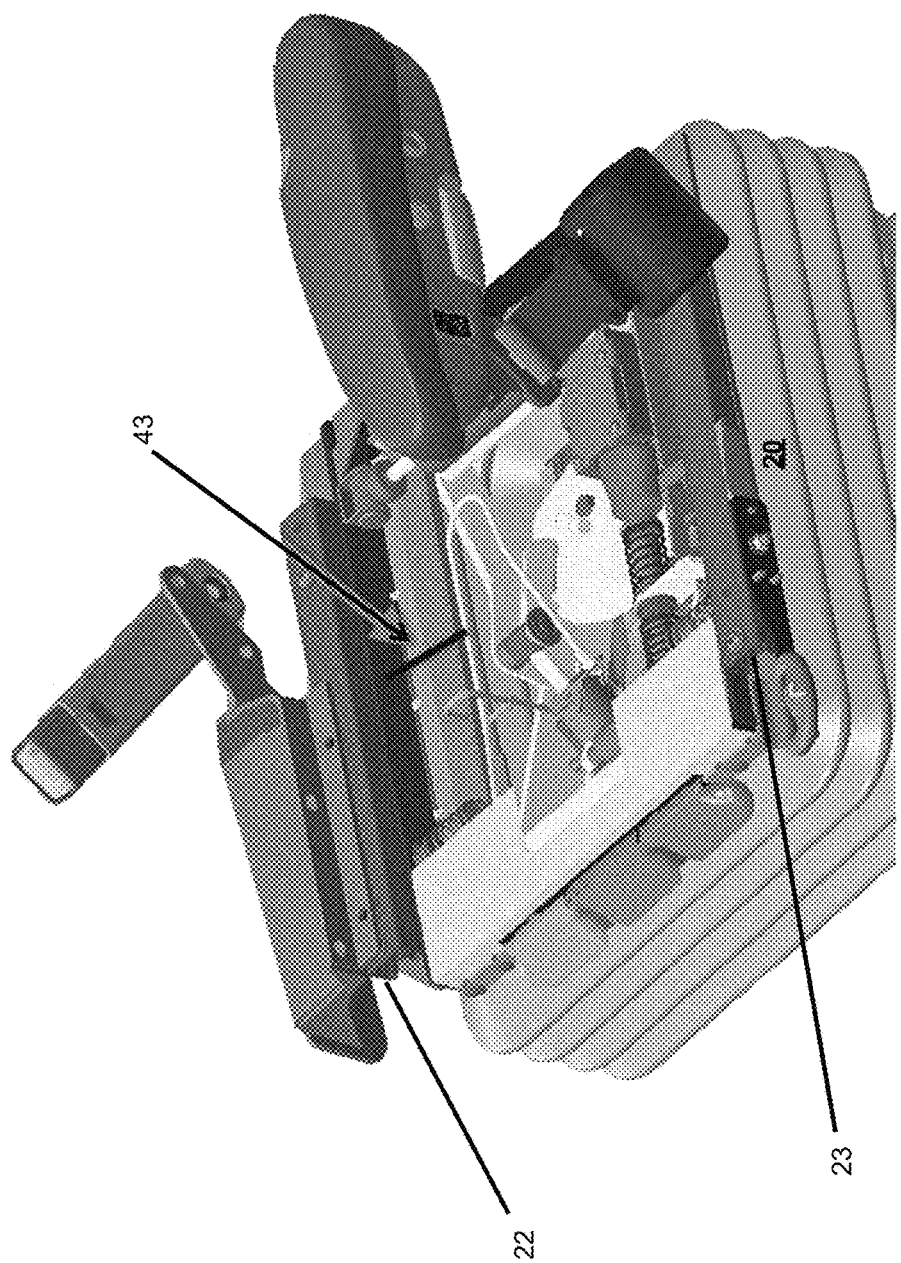
Figure 3:
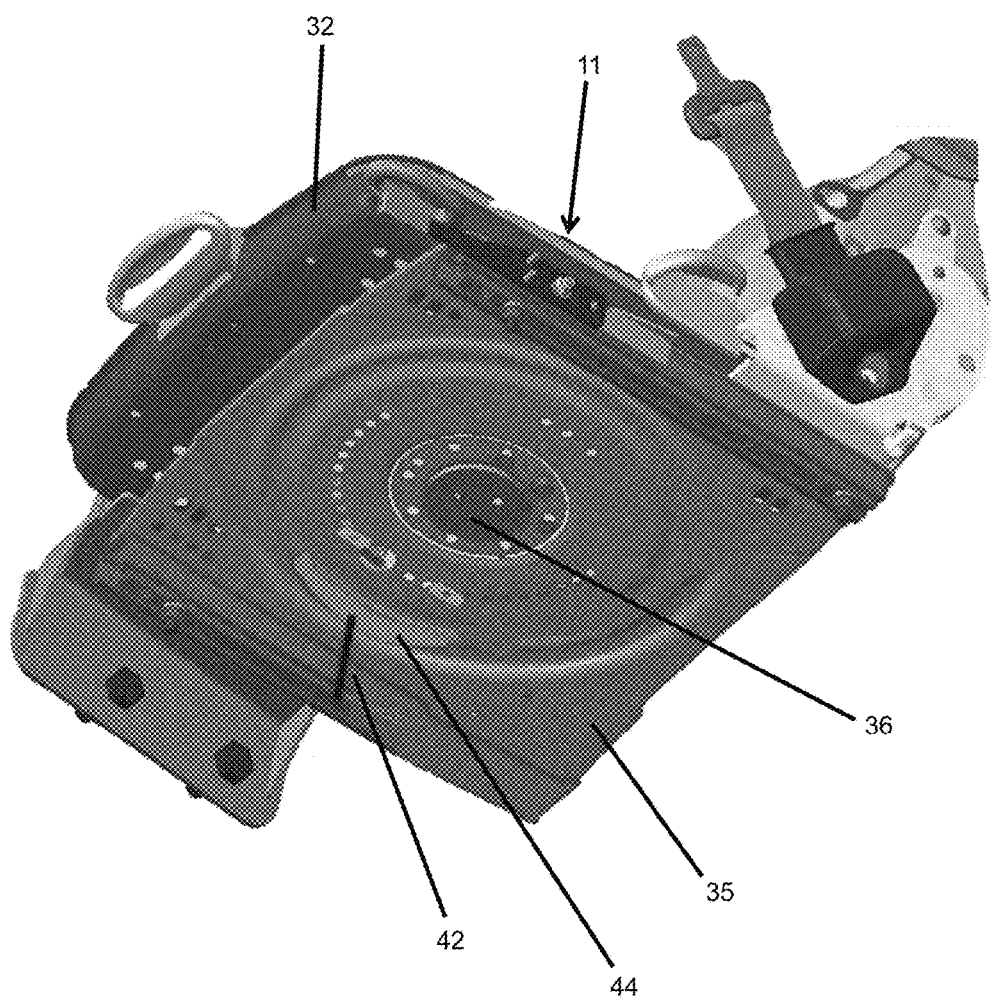

According to the invention, a swivel restrictor assembly (40) limits the maximum range that the seat bottom (11) of the operator seat (10) may be rotated relative the mounting base (20). This may be desirable to prevent interference of portions of the operator seat (10) such as the seat bottom (11), the seat back (12), or the at least one armrest (13) with other components in the operator cab (not shown) of the work vehicle (not shown). In one embodiment, the swivel restrictor assembly (40) includes a first swivel stop (42) mounted on the seat pan (32). The first swivel stop (42) extends through a slot (44) in the base plate (35) so that as the seat pan (32) rotates relative the base plate (35), the first swivel stop (42) moves along the slot (44) in the base plate (35). The swivel restrictor assembly (40) also includes a second swivel stop (43) mounted in in a fixed relationship relative the mounting base (20). In the illustrated embodiment, the first and second swivel stops (42, 43) are generally elongate rods that are mounted substantially perpendicular to each other. As best seen in FIG. 3, the first swivel stop (42) extends generally vertically downward from the seat pan (32). As best seen in FIG. 2 the second swivel stop (43) extends generally horizontally from the mounting base (20).

The slot (44) is shaped to allow the first swivel stop (42) to freely travel in the slot (44) while the seat pan (32) rotates relative the base plate (35). However, at some point in the rotation, the first swivel stop (42) will contact the second swivel stop (43), thereby preventing further rotation of the seat pan (32) relative the base plate (35). The point in the rotation at which the first swivel stop (42) contacts the second swivel stop (43) depends on the translation position of the base plate (35) relative the mounting base (20).

Figure 4:
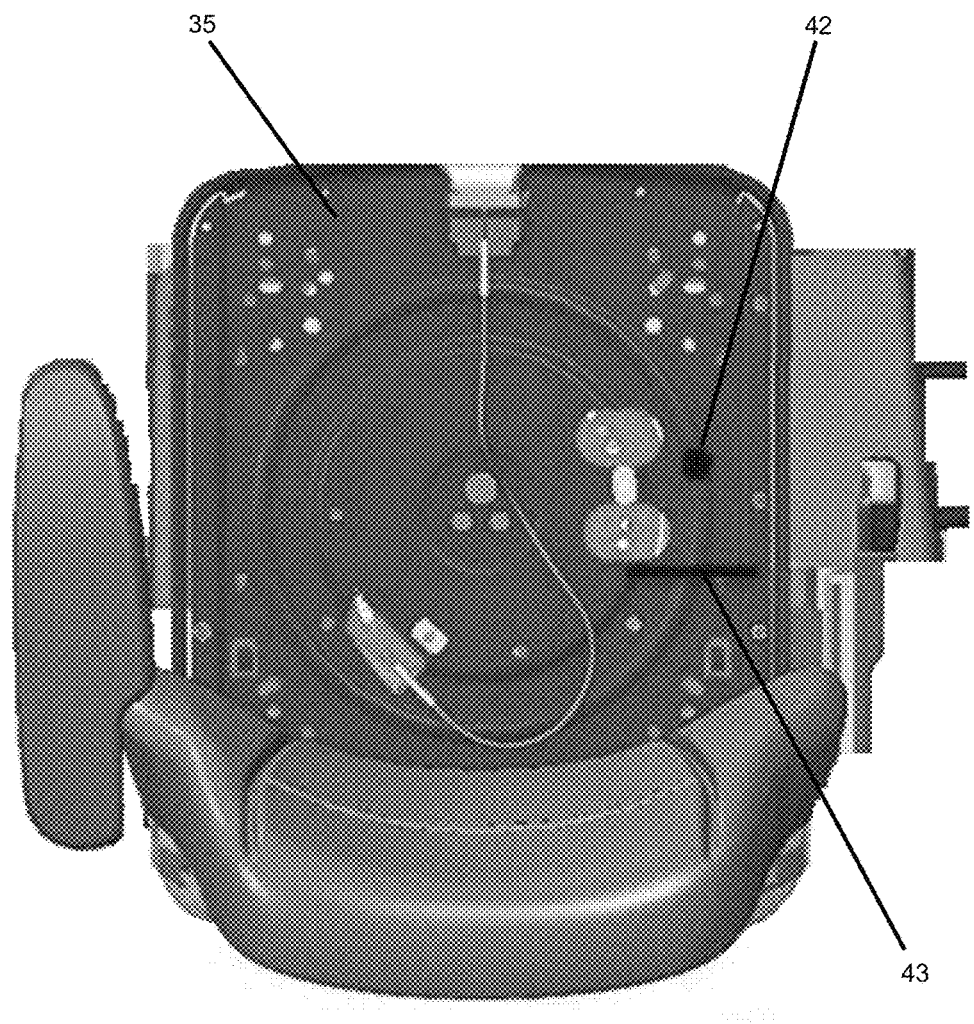
Figure 5:
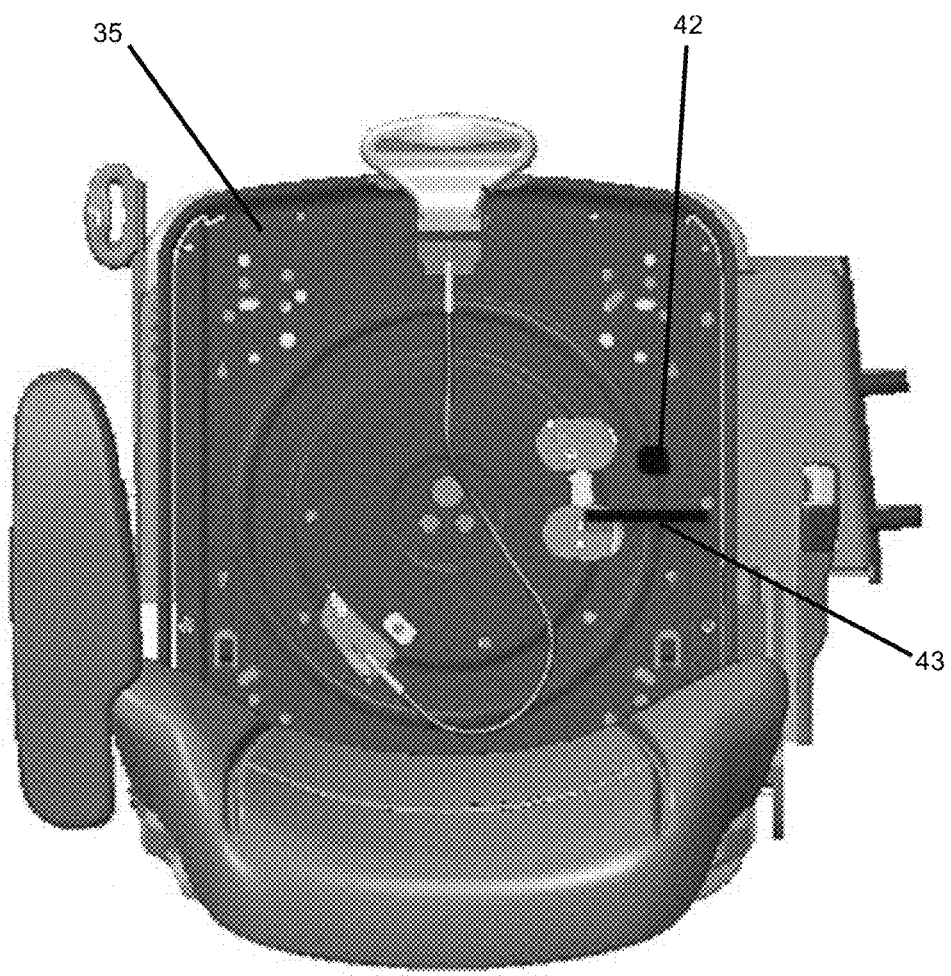

In one embodiment, as the seat pan (32) is moved forward by the translation structure (34) relative the mounting base (20) as seen in FIG. 4, the first swivel stop (42) moves away from the second swivel stop (43), thereby increasing the distance the seat pan (32) is able to rotate relative the base plate (35) before the first swivel stop (42) contacts the second swivel stop (43). Thus, in this base plate position there a greater range of rotation of the operator seat (10). As the seat pan (32) is moved rearward by movement of the base plate (35) as seen in FIG. 5, the first swivel stop (42) mounted on the seat pan (32) is moved closer to the second swivel stop (43) mounted on the mounting base (20) limiting the distance that the first swivel stop (42) can travel in the slot (44) before the second swivel stop (43) prevents further movement of the first swivel stop (42). Thus, in this position there is a reduced range of rotation of the operator seat (10) as compared to the range of motion when the base plate is in the forward position.

In one exemplary working implementation of the seat swivel restrictor assembly (40), the seat pan (32) of the operator seat (10) is repositionable over a maximum range of rotation of approximately 40-50 degrees in a first rotational direction when the base plate (35) is moved to a forward-most position relative the mounting base (20), and has a reduced range of rotation of the seat pan (32) of approximately 20-25 degrees when the base plate (35) is moved to a rearward-most position relative the mounting base (20).

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

At least the following is claimed:

1. A swiveling operator seat for a work vehicle comprising:
   a seat mounting base mountable to a frame of a work vehicle;
   a seat bottom;
   an intermediate assembly having a seat pan and a base plate, the seat bottom being mounted on the seat pan, the seat pan being mounted to the base plate with a swiveling mechanism so that the seat pan rotates relative the base plate, and the base plate being mounted for translational forward and rearward movement with respect to the seat mounting base between a forward-most position and a rearward-most position such that the seat bottom is mounted for rotational and translational movement relative the seat mounting base, wherein the base plate has a slot formed therein; and
   a swivel restrictor assembly which limits a range that the seat bottom may be rotated, wherein the range that the seat bottom may be rotated is different in the forward-most position and the rearward-most position, wherein the swivel restrictor assembly comprises a first swivel stop mounted on the seat pan and a second swivel stop mounted on the seat mounting base, wherein the first swivel stop moves in the slot when the seat pan rotates relative the base plate and the first swivel stop contacts the second swivel stop to limit the range that the seat bottom may be rotated.

2. The swiveling operator seat of claim 1 wherein the first swivel stop and the second swivel stop are elongate rods that are mounted substantially perpendicular to each other.

3. The swiveling operator seat of claim 2 wherein the first swivel stop extends vertically downward from the seat pan and the second swivel stop extends in a horizontal direction from the seat mounting base.

4. A swiveling operator seat for a work vehicle comprising:
   a seat mounting base mountable to a frame of a work vehicle;
   a seat bottom;
   an intermediate assembly having a seat pan and a base plate, the seat bottom being mounted on the seat pan, the seat pan being mounted to the base plate with a swiveling mechanism so that the seat pan rotates relative the base plate, and the base plate being mounted for translational forward and rearward movement with respect to the seat mounting base between a forward-most position and a rearward-most position such that the seat bottom is mounted for rotational and translational movement relative the seat mounting base; and
   a swivel restrictor assembly which limits a range that the seat bottom may be rotated, wherein the range that the seat bottom may be rotated is different in the forward-most position and the rearward-most position, wherein the swivel restrictor assembly comprises a first swivel stop mounted on the seat pan and a second swivel stop mounted on the seat mounting base, wherein the first swivel stop and the second swivel stop are elongate rods that are mounted substantially perpendicular to each other and the first swivel stop contacts the second swivel stop to limit the range that the seat bottom may be rotated.

5. The swiveling operator seat of claim 4 wherein the first swivel stop extends vertically downward from the seat pan and the second swivel stop extends in a horizontal direction from the seat mounting base.

6. A swiveling operator seat for a work vehicle comprising:
   a seat mounting base mountable to a frame of a work vehicle;

a seat bottom;

an intermediate assembly having a seat pan and a base plate, the seat bottom being mounted on the seat pan, the seat pan being mounted to the base plate with a swiveling mechanism so that the seat pan rotates relative the base plate, and the base plate being mounted for translational forward and rearward movement with respect to the seat mounting base between a forward-most position and a rearward-most position such that the seat bottom is mounted for rotational and translational movement relative the seat mounting base; and a swivel restrictor assembly which limits a range that the seat bottom may be rotated, wherein the range that the seat bottom may be rotated is different in the forward-most position and the rearward-most position, wherein the swivel restrictor assembly comprises a first swivel stop mounted on the seat pan and a second swivel stop mounted on the seat mounting base, wherein the first swivel stop extends vertically downward from the seat pan and the second swivel stop extends in a horizontal direction from the seat mounting base and the first swivel stop contacts the second swivel stop to limit the range that the seat bottom may be rotated.

* * * * *

UNITED STATES PATENT AND TRADEMARK OFFICE
CERTIFICATE OF CORRECTION

Page 1 of 1

PATENT NO.       : 9,889,772 B2
APPLICATION NO.  : 15/413295
DATED            : February 13, 2018
INVENTOR(S)      : Timothy Allen Murray It is certified that error appears in the above-identified patent and that said Letters Patent is hereby corrected as shown below:

On the Title Page

Item [72], insert --Jeffrey D. Linnberg--

Signed and Sealed this
First Day of September, 2020

Andrei Iancu
*Director of the United States Patent and Trademark Office*